United States Patent [19]

Sato

[11] Patent Number: 6,055,462
[45] Date of Patent: Apr. 25, 2000

[54] LOADING PATTERN GENERATING SYSTEM AND LOADING DEVICE

[75] Inventor: Toshiyuki Sato, Takasago, Japan

[73] Assignee: Okura Yosoki Kabushiki Kaisha, Japan

[21] Appl. No.: 09/108,582

[22] Filed: Jul. 1, 1998

[30] Foreign Application Priority Data

Oct. 14, 1997 [JP] Japan ..................................... 9-280475

[51] Int. Cl.$^7$ ...................................................... G06F 7/00
[52] U.S. Cl. ........................................... 700/217; 700/261
[58] Field of Search .................................... 700/217, 218, 700/214, 257, 261

[56] References Cited

U.S. PATENT DOCUMENTS

| | | | |
|---|---|---|---|
| Re. 33,416 | 10/1990 | Konishi et al. | 700/217 |
| 4,287,459 | 9/1981 | Dahlstrom | 700/217 |
| 5,050,090 | 9/1991 | Golub et al. | 700/217 |
| 5,656,005 | 8/1997 | Cummings et al. | 700/217 |
| 5,844,807 | 12/1998 | Anderson et al. | 700/217 |

*Primary Examiner*—Christopher P. Ellis
*Assistant Examiner*—Khoi H. Tran
*Attorney, Agent, or Firm*—Morrison Law Firm

[57] ABSTRACT

A loading pattern generating system requires only the input of loading pattern generating conditions to automatically generate a loading pattern which satisfies the target capacity within the physical constraints of a loading system. The loading pattern generating conditions include the size of a pallet, the size of a product, data relating to a loading device, and the target capacity to load products on a pallet. A candidate pattern registration device stores a plurality of candidate patterns for loading products on a pallet. A calculation section prepares a loading pattern which controls a loading device corresponding to the loading pattern generating conditions that have been input. The loading pattern is selected from the candidate patterns stored in the candidate pattern registration means device. The calculation section calculates the resulting loading capacity. This loading capacity is adjusted to satisfy the target loading capacity. The maximum torque on the palletizer is compared with an allowed torque. When the torque exceeds the maximum, the candidate pattern is rejected, and calculation is performed on the next candidate pattern. An output section outputs the resulting loading pattern.

6 Claims, 11 Drawing Sheets

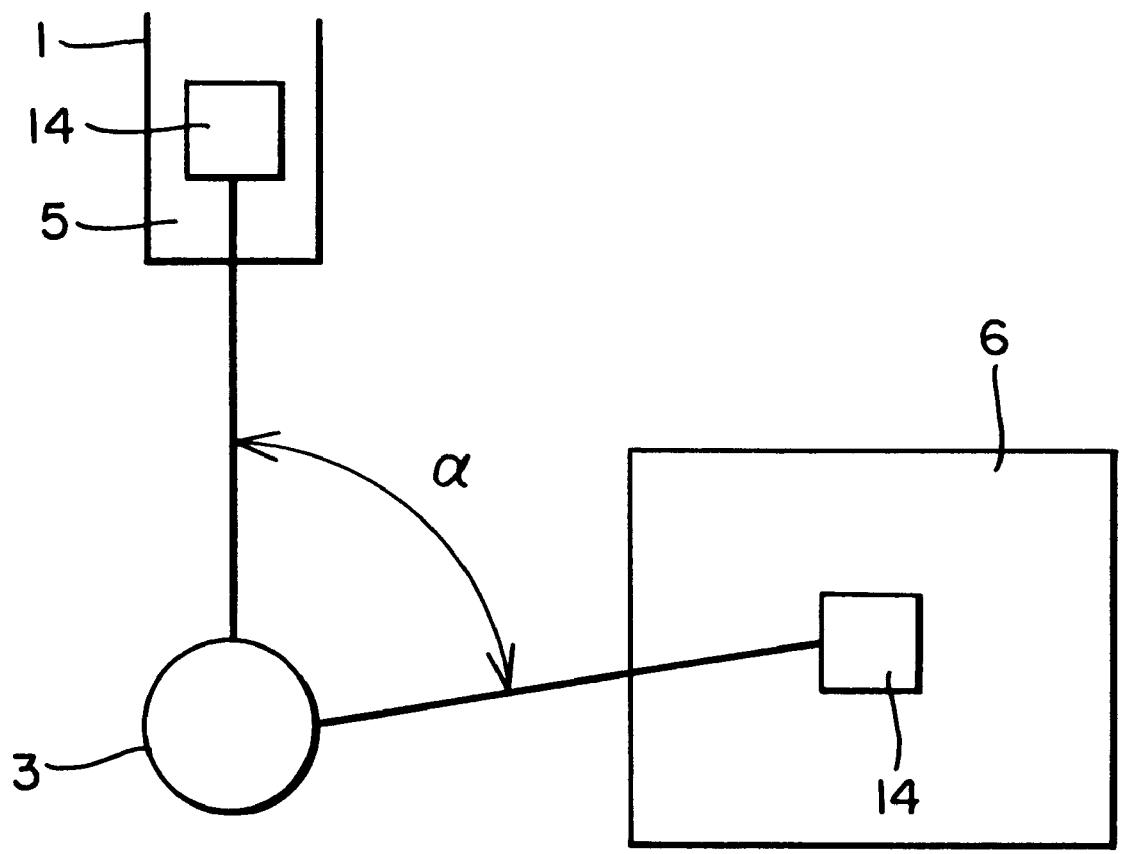
F I G. 3

FIG. 4

SIZE DATA INPUT

PROGRAM NO. [ 1 ]  COMMENT (E)   AUTOMATIC GENERATION TEST

SIZE OF TRANSPORTED OBJECT
- LENGTH (L)  [240] (mm)
- WIDTH (W)   [300] (mm)
- HEIGHT (H)  [201] (mm)
- WEIGHT (G)  [10]  (kg)

SIZE OF PALLET
- PL    [1200] (mm)
- PW    [1100] (mm)
- PH    [140]  (mm)
- OHL 1 [150]  (mm)
- OHL 2 [150]  (mm)
- OHw   [150]  (mm)

LOADING METHOD (T)

CLOSE (C)

PROGRAM DELETION (D)

INCHING DISTANCE (R)

PALLET LIST (M)

STATION
- STATION (S)        [ | ]
- PALLET STATION (P) [ | ]
- HAND NO. (A)       [ | ]
- TYPE OF PALLET (I) [ | ]

☐ DEPALLE ACTION

☐ AUTOMATIC GENERATION    SETTING (B)

AUTOMATIC GENERATION SETTING

AUTOMATIC GENERATION TYPE

PATTERN AUTOMATIC GENERATION IS NOT PERFORMED
AUTOMATIC GENERATION BY PRESENT HAND AND SET VALUE (APPROXIMATE VALUE)
AUTOMATIC GENERATION BY MAXIMUM NUMBER OF PRODUCTS GRIPPED BY PRESENT HAND
AUTOMATIC GENERATION BY SET VALUE OF TARGET CAPACITY (APPROXIMATE VALUE)

AUTOMATIC GENERATION BY SET VALUE OF TARGET CAPACITY (MAXIMUM VALUE)

TARGET CAPACITY

2000  TRANSPORTED OBJECT/HOUR

MINIMUM LOADING EFFICIENCY

85  %

TIME SETTING (msec)

HAND OPENING  150
HAND CLOSING  150
PALLET REPLACING  2000

OK

Cancel

| LOADING METHOD | | |
|---|---|---|
| PROGRAM NO. | 1 | |
| MAXIMUM REGISTERED NUMBER OF STEPS (M) | 8 | |
| NUMBER OF LOADING-PRACTICED STEPS (S) | 8 | |
| NUMBER OF PRODUCTS TO START RETRIEVING (N) | 26 | |
| GRADUALLY DECREASING VALUE (D) mm | 0 | |
| MAXIMUM NUMBER OF PLURAL GRIPPED PRODUCTS | 1 | |
| TYPE OF TRANSPORTED OBJECT | CASE | |
| UNLOADING METHOD (U) | FIXED | VARIABLE |
| LOADING METHOD (Y) | BAR-LIKE LOADING / ALTERNATE LOADING / SPECIAL LOADING | |

☐ ALTERNATE SPECIAL TYPE
☐ TOP STEP DIFFERENT PATTERN
☐ PALLET OUTER FACE MATING

COMMENT: AUTOMATIC GENERATION TEST

LOADING PATTERN

PALLET ORIGIN
LEFT SIDE
TOP (F)        FIRST STEP
BOTTOM (V)

| 9 | 5 | 1 | 2 | 3 | 4 | 13 |
|---|---|---|---|---|---|---|
| 10 | 6 | | | | | |
| 11 | 7 | | | | | |
| 12 | 8 | 16 | 15 | 14 | | |

MAXIMUM CAPACITY CALCULATION RESULT

| PLANNED CAPACITY (Case/Hour) | 2104 |
| RECOMMENDED HAND LENGTH (mm) | 867 +α |
| R-AXIS TORQUE (%) | 56 |
| D-AXIS TORQUE (%) | 34 |
| O-AXIS TORQUE (%) | 48 |

- SIDE DISPLAY (2)
- THREE-DIMENSIONAL DISPLAY (3)
- CANDIDATE REGISTRATION (E)
- PILING (O)
- CAPACITY (C)
- CLOSE

LOADING PATTERN GENERATING SYSTEM AND LOADING DEVICE

BACKGROUND OF THE INVENTION

The present invention relates to a loading pattern generating system for automatically generating a loading pattern to load products on a pallet, and a loading device that employs the loading pattern generating system.

Previously, for example, in physical distribution, when a plurality of products in which goods, packed by boxes or bags, are loaded on a pallet for transportation by a truck or the like, a loading device such as a robot palletizer, has been used to load the products on the pallet.

The loading device has a robot hand for gripping and moving products. The loading device, while repeatedly going back and forth between a station supplying the products to be loaded and a pallet, controls the hand to load a plurality of products on the pallet according to a previously set loading pattern. The loading pattern controls the number of products gripped by the hand of the loading device, the arrangement of products for each step on the pallet, the number of loading steps and the like.

In such a loading device, when a loading pattern is designed, it is selected from a plurality of previously stored candidate patterns. The operator selects one of the stored loading patterns from his experience considering the size of the pallet, the size of the product, the size and the layout of the hand of the loading device and the like.

However, previously, there has been a problem that, since the selection of a loading pattern is left to the judgment of the operator, certain deficiencies in loading capacity may result. For example, the number of products loaded per hour may be less than the target value, or the maximum torque applied to the loading device may exceed its rated value. In the latter case, a safety control of the loading device stops the loading job.

OBJECTS AND SUMMARY OF THE INVENTION

In order to solve the above problems, an object of the present invention is to provide a loading pattern generating system which automatically generates a loading pattern responsive to loading pattern generating conditions. The resulting loading pattern avoids deficiencies in loading capacity and excessive torque when products are actually loaded, as well as fulfilling the target capacity. In addition, the present invention provides a loading device that is response to the loading pattern generating system.

The loading pattern generating system according to the present invention consist of an input means for inputting the loading pattern generating conditions including at least the size of a pallet, the size of products to be loaded on the pallet, the data relating to a loading device to load the products on the pallet, and the target capacity to load the products on the pallet; a candidate pattern registration means in which a plurality of candidate patterns for loading the products on the pallet are registered; a calculation means which prepares a loading pattern for controlling the loading device corresponding to the loading pattern generating conditions inputted by the input means, on the basis of the candidate patterns registered in said candidate pattern registration means and which performs capacity calculation to find the loading capacity of the loading pattern and which finds such a loading pattern that the loading capacity fulfills the target capacity; and an output means for outputting the loading pattern calculated by the calculation means.

In response only to the input of loading pattern generating conditions, a loading pattern is prepared on the basis of the loading pattern generating conditions and the candidate patterns. A capacity calculation finds the loading capacity of the loading pattern. The loading pattern includes a calculation that ensures that the loading capacity is fulfilled. For this, the target capacity is calculated, and consequently, a loading pattern is automatically generated. The loading pattern is not affected by the experience of the operator. Therefore, the present invention avoids operator variability that may cause deficiency of loading capacity when the products are actually loaded by the loading device.

The loading pattern generating system of the present invention summarized further includes calculation means for performing torque calculations to find the torque necessary for the loading device operated by the prepared loading pattern. The system find the loading pattern that maintains the torque within the specified torque of the loading device, while fulfilling the target loading capacity.

Torque calculation to find the torque necessary for the loading device in the prepared loading pattern is performed. The loading pattern selected is one that maintains the torque within the specified torque of the loading device while fulfilling the target. In this way a loading pattern is automatically generated, which does not exceed the maximum allowed torque of the loading device but maintains the loading capacity when the products are actually loaded by the loading device.

The loading device of the present invention also includes a loading machine to load the products on a pallet according to the loading pattern calculated by the loading pattern generating system.

The products are loaded on a pallet by the loading machine according to the loading pattern calculated by the loading pattern generating system, and consequently, deficiency of loading capacity or torque over of the loading machine does not occur when loading the products.

Briefly stated, the present invention provides a loading pattern generating system that requires only the input of loading pattern generating conditions to automatically generate a loading pattern which satisfies the target capacity within the physical constraints of a loading system. The loading pattern generating conditions include the size of a pallet, the size of a product, data relating to a loading device, and the target capacity to load products on a pallet. A candidate pattern registration device stores a plurality of candidate patterns for loading products on a pallet. A calculation section prepares a loading pattern which controls a loading device corresponding to the loading pattern generating conditions that have been input. The loading pattern is selected from the candidate patterns stored in the candidate pattern registration means device. The calculation section calculates the resulting loading capacity. This loading capacity is adjusted to satisfy the target loading capacity. The maximum torque on the palletizer is compared with an allowed torque. When the torque exceeds the maximum, the candidate pattern is rejected, and calculation is performed on the next candidate pattern. An output section outputs the resulting loading pattern.

According to an embodiment of the invention, there is provided a loading pattern generating system comprising: input means for inputting loading pattern generating conditions, the loading pattern generating conditions including at least size of a pallet, a size of a product to be loaded on the pallet, data relating to a loading device for loading products on the pallet, and a target capacity to load products on a pallet, a candidate pattern registration means in which a plurality of candidate patterns to load products on the pallet are registered, calculation means for preparing a loading pattern for controlling the loading device corresponding to the loading pattern generating conditions inputted by the input means, on the basis of the candidate patterns registered in the candidate pattern registration means, and which performs capacity calculation to find loading capacity of the loading pattern, and which finds such a loading pattern that the loading capacity fulfills the target capacity, and output means for outputting the loading pattern calculated by the calculation means.

According to a feature of the invention, there is provided a loading pattern generating system, the system being of a type using a controllable hand for loading a plurality of a product onto a pallet, comprising: a candidate pattern registration means, the candidate pattern registration means including a plurality of candidate patterns for loading the product onto the pallet, input means for inputting setting which include at least some of a target capacity, a pallet size, a product size, a type of palletizer and a size of a the hand, means for comparing a result of ones of the plurality of candidate patterns to find a one of the candidate patterns that satisfies the settings, means for calculating whether a torque imposed on the palletizer by a candidate pattern exceeds a maximum permitted torque, means for outputting a candidate pattern with satisfies both the settings and which does not exceed the maximum permitted torque, and when the conditions in the preceding clause are not satisfied, the means for comparing proceeds to a next candidate pattern to repeat the comparison and calculation.

The above, and other objects, features and advantages of the present invention will become apparent from the following description read in conjunction with the accompanying drawings, in which like reference numerals designate the elements.

BRIEF DESCRIPTION OF THE DRAWINGS

FIG. 3 is a simplified illustration of the loading action of a loading device according to an embodiment of the present invention.

FIG. 4 is a diagram of a display screen during inputting, according to an embodiment of the present invention.

FIG. 5 is a diagram of a display screen during inputting according to an embodiment of the present invention.

FIG. 6 is a diagram of a display screen during outputting according to an embodiment of the present invention.

DETAILED DESCRIPTION OF THE PREFERRED EMBODIMENT

Figure 2:
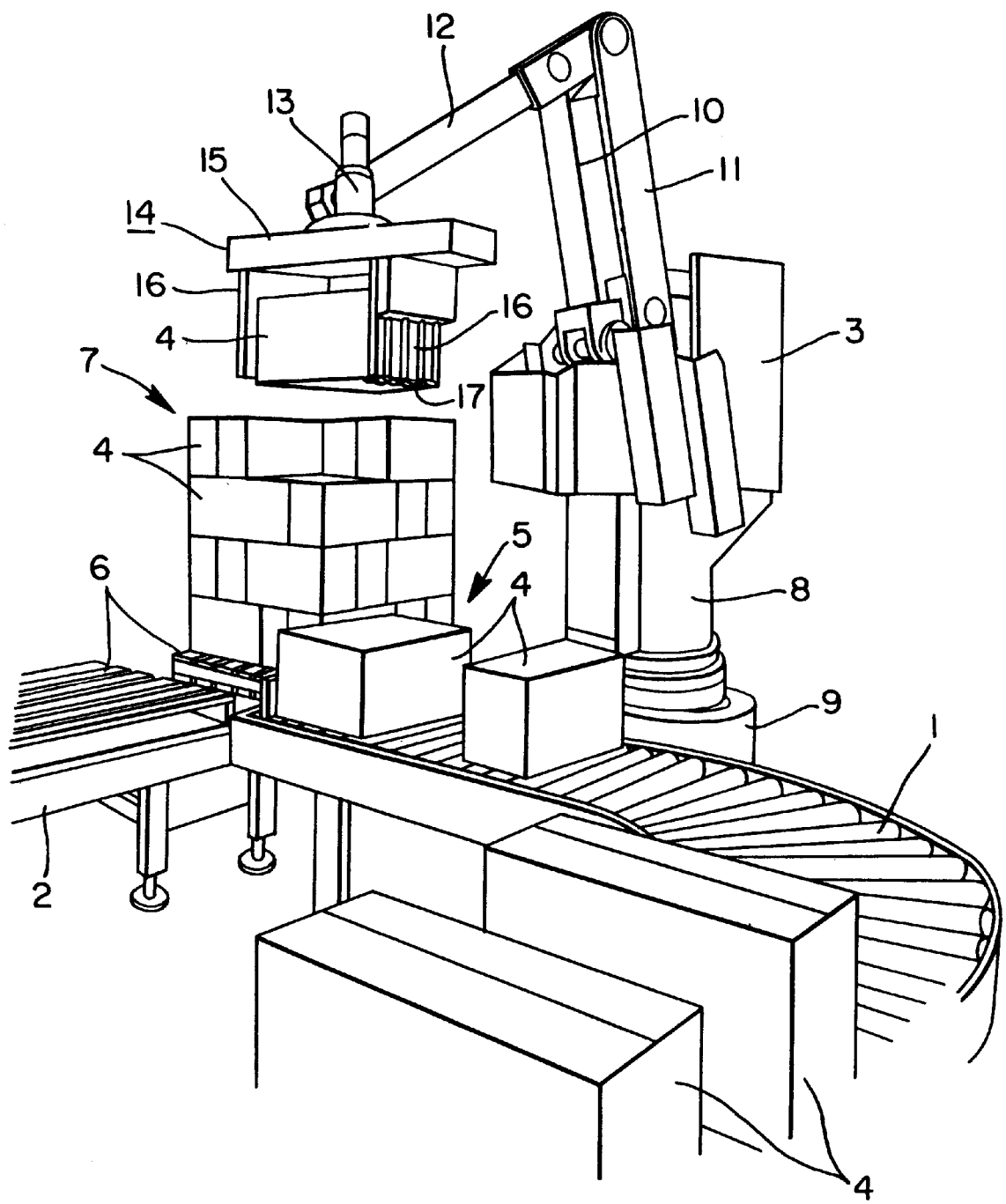
FIG. 2 is an oblique view of a loading device according to an embodiment of the present invention.
Figure 7:
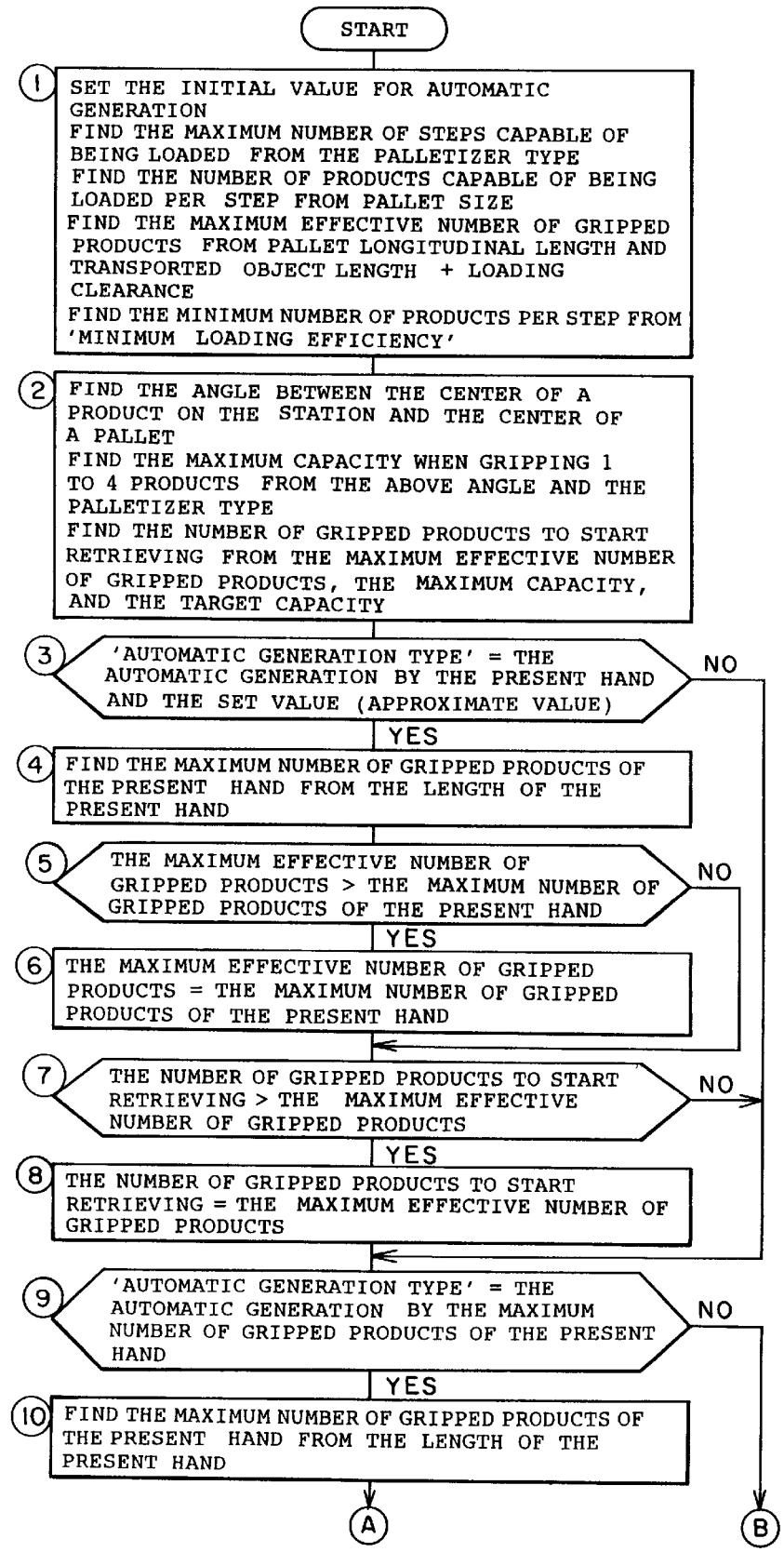
FIG. 7 is a flow chart according to an embodiment of the present invention.
Figure 8:
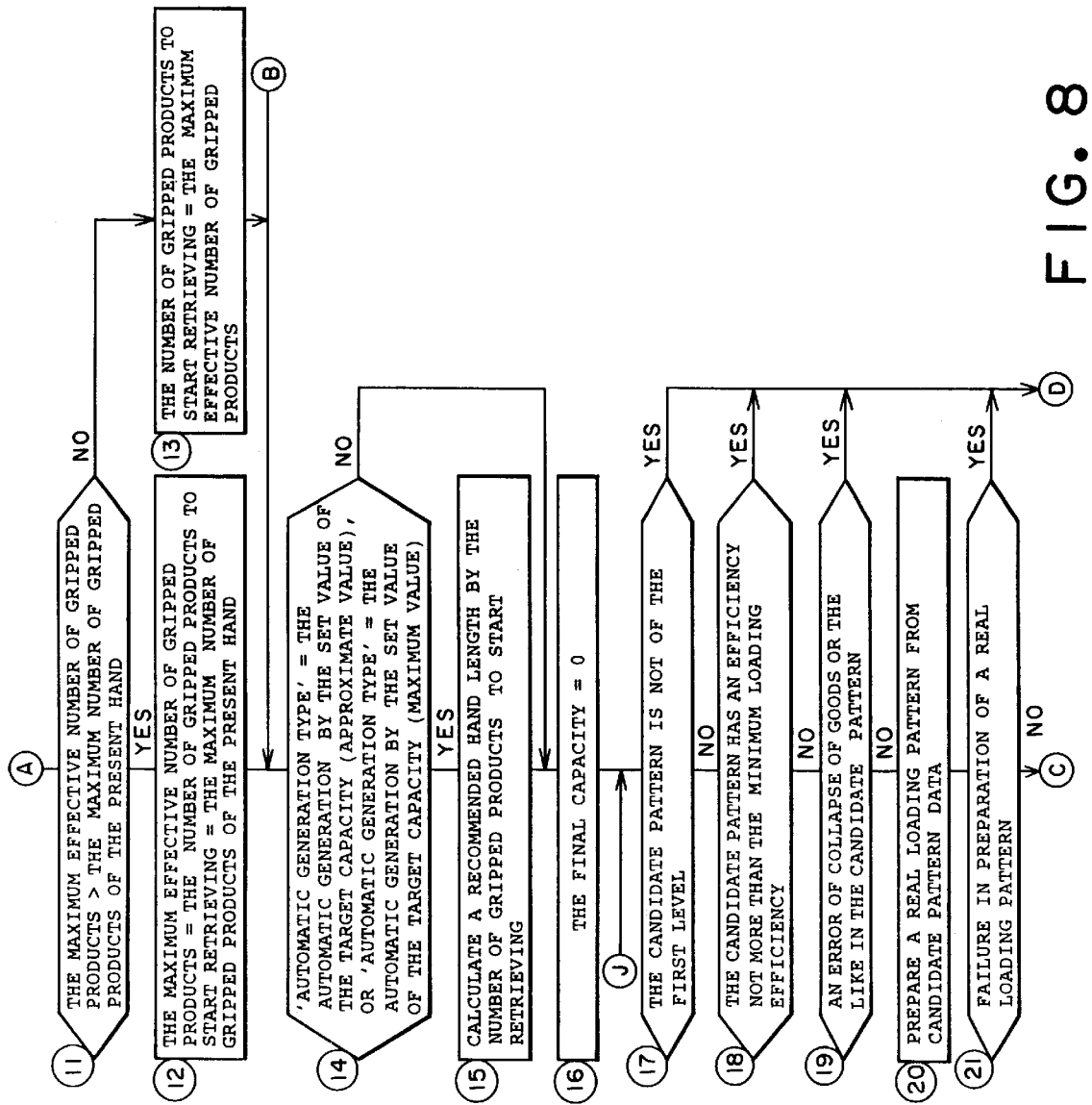
FIG. 8 is a continuation flow chart of FIG. 7.
Figure 9:
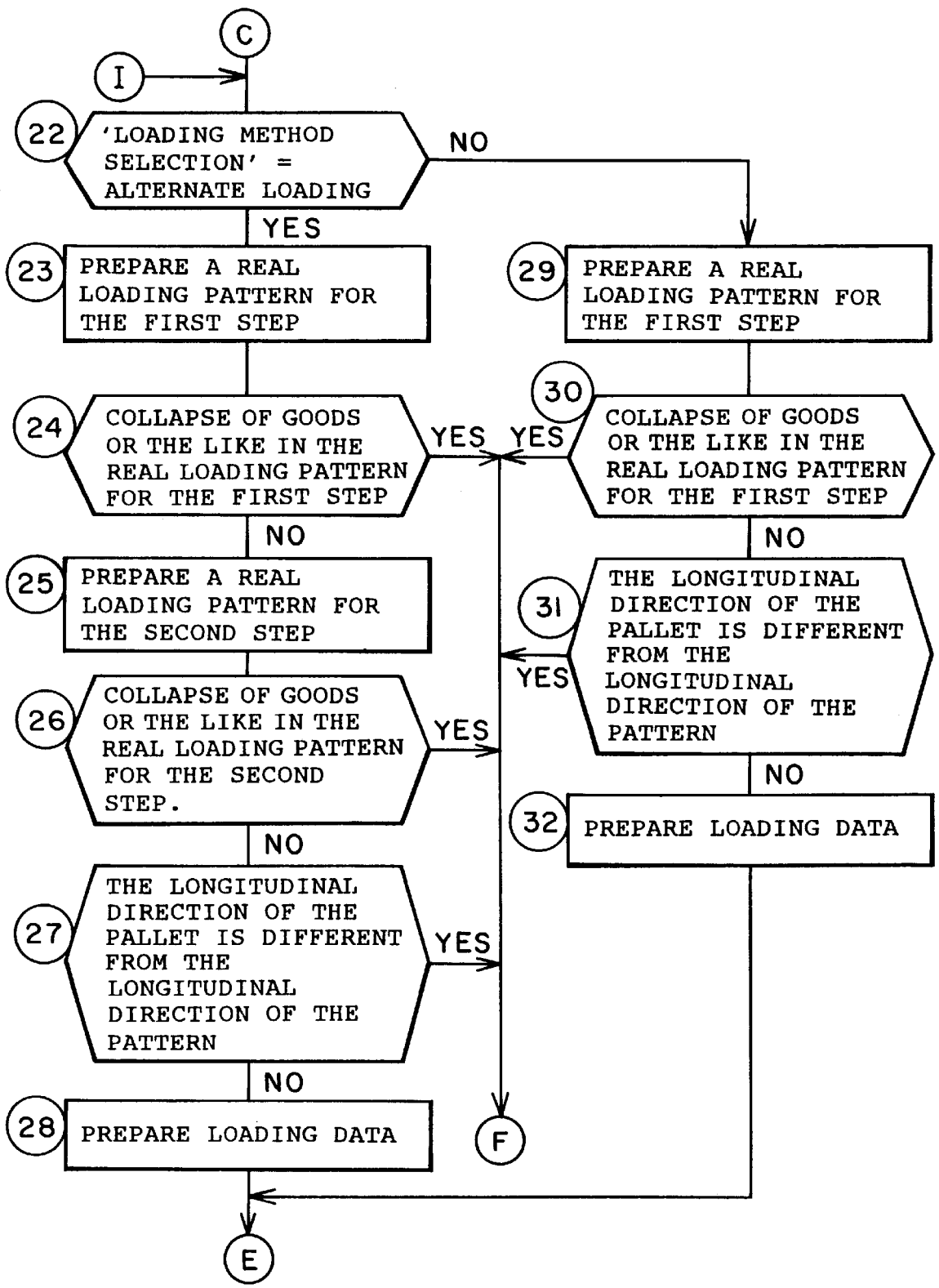
FIG. 9 is a continuation flow chart of FIG. 8.
Figure 10:
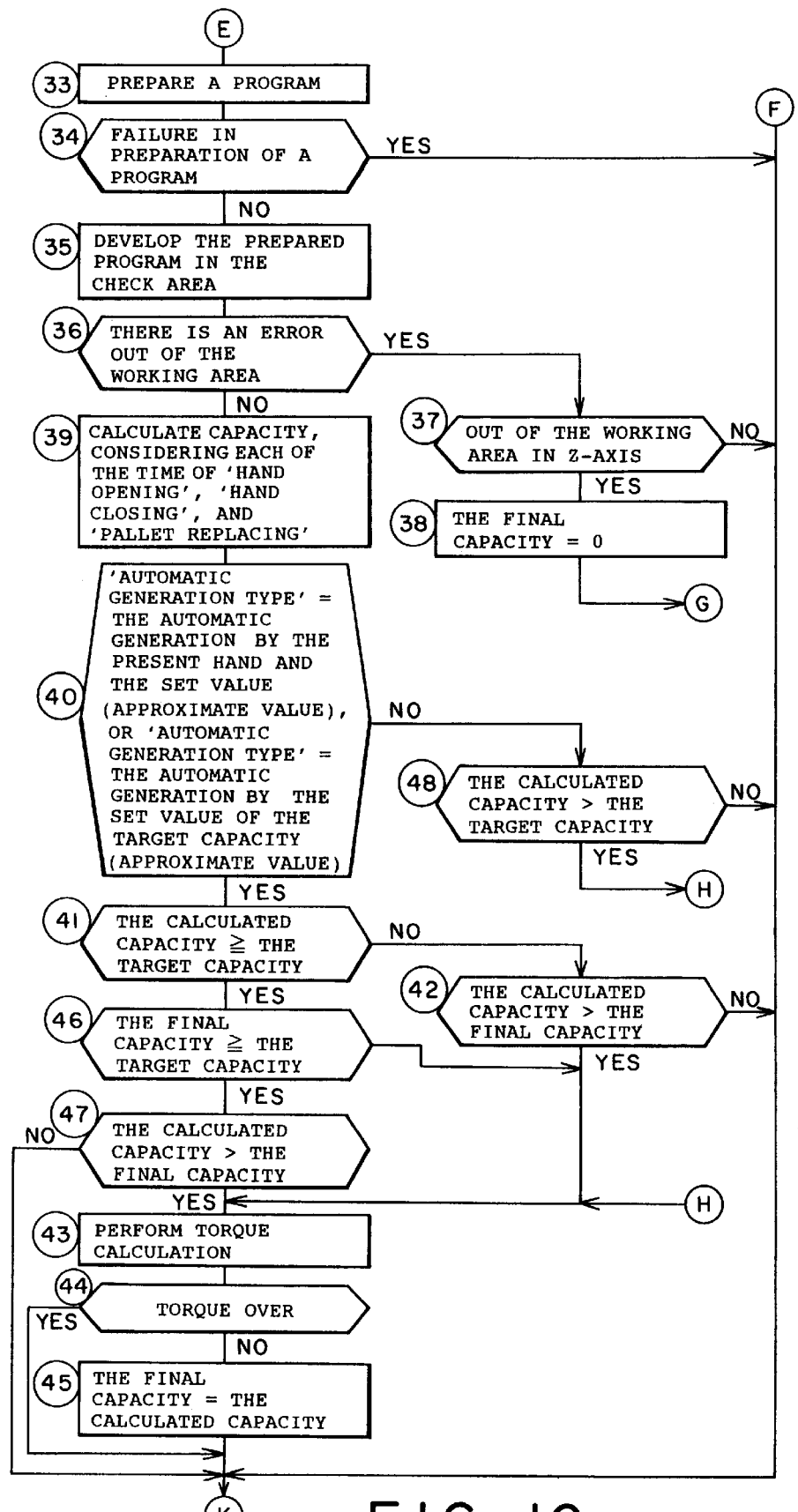
FIG. 10 is a continuation flow chart of FIG. 9.
Figure 11:
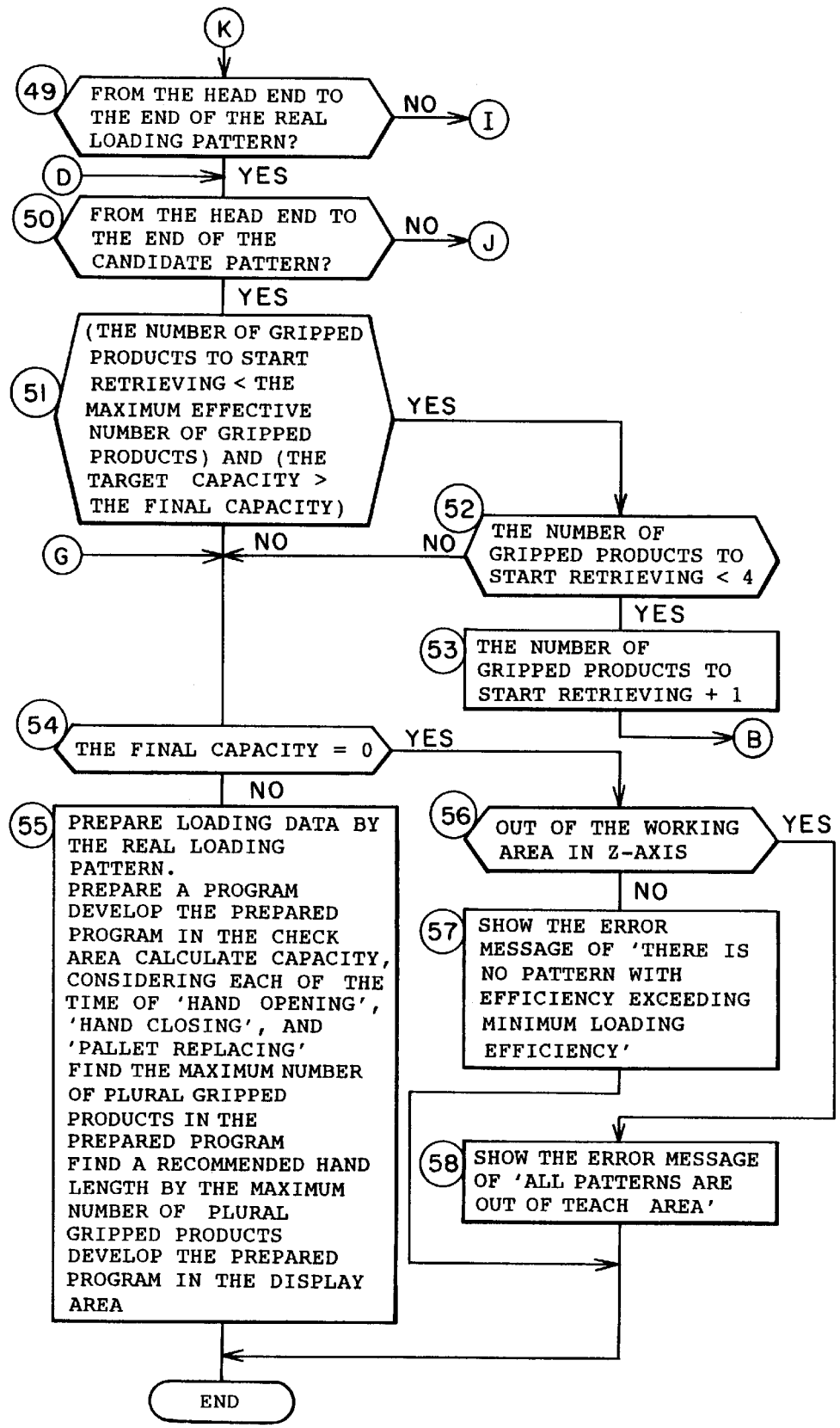
FIG. 11 is a continuation flow chart of FIG. 10.

Referring to FIG. 2, a loading device according to the invention includes a product conveyer 1, a pallet conveyer 2, and a palletizer (robot palletizer) 3. Product 4 to be loaded are box shaped. Product conveyer 1 conveys products 4 on its belt to feed a specified number of products 4 to palletizer 3. Palletizer 3 grips one or more product 4, then transfers it to a station 5 near the palletizer 3.

An empty pallet 6, upon which products 4 are to be loaded, is conveyed by the pallet conveyer 2 to a loading position 7 near palletizer 3. When the pallet 6 at the loading position 7 is fully loaded with the product 4, it is removed and replaced by a new empty pallet 6 from the pallet conveyor 2.

The palletizer 3 has a main body section 8 supported on a base 9 installed on the floor. Main body section 8 is rotatable on base 9. The lower ends of a plurality of arms 10, 11 are pivoted to main body section 8 to permit them to rock back and forth. The upper ends of arms 10, 11 are connected to a base end of an arm 12. A hand attaching section 13 is rotatably connected to the tip of the arm 12. A hand 14 is rotatably connected to hand attaching section 13.

The hand 14 has a base section 15 rotatably connected to the hand attaching section 13. A pair of plates 16 extend downward from the opposed ends of the under surface of the base section 15. Plates 16 move toward and away from each other to grip products 4 and to release them, as necessary to load the pallet 6. One of the plates 16 includes a claw 17 which touches and supports the under surface of the products.

The respective actions of the palletizer 3, which include turning of the main body section 8, rocking of the arms 10, 11, rotation of the hand attaching section 13, rotation of the hand 14, opening and closing of the pair of plates 16 of the hand 14, are driven by any convenient means such as, for example, a motor, a hydraulic cylinder or a pneumatic cylinder. Movement of the hand 14 at the tip of the arm 12 is accomplished by combining the actions of the palletizer 3, which include turning R, vertical movement D, and back and forth movement 0 of the hand 14 at the tip of the arm 12.

Referring now to FIG. 3, the palletizer 3 is operated according to a specified loading pattern. It grips and lifts the products 4 supplied to the station by the hand 14. Then it moves the hand 14, holding the product 4, to a position above the pallet 6. Then it lowers the hand 14 to deliver the product 4 to the loading position. Finally, it releases the products 4 from the hand 14 to the desired position and orientation on the pallet 6. Then the hand 14 is driven back to pick up the next products. The reciprocating motion of the hand 14 between the station 5 and the pallet 6 loads a plurality of products 4 on the pallet 6 in a specified order.

Figure 1:
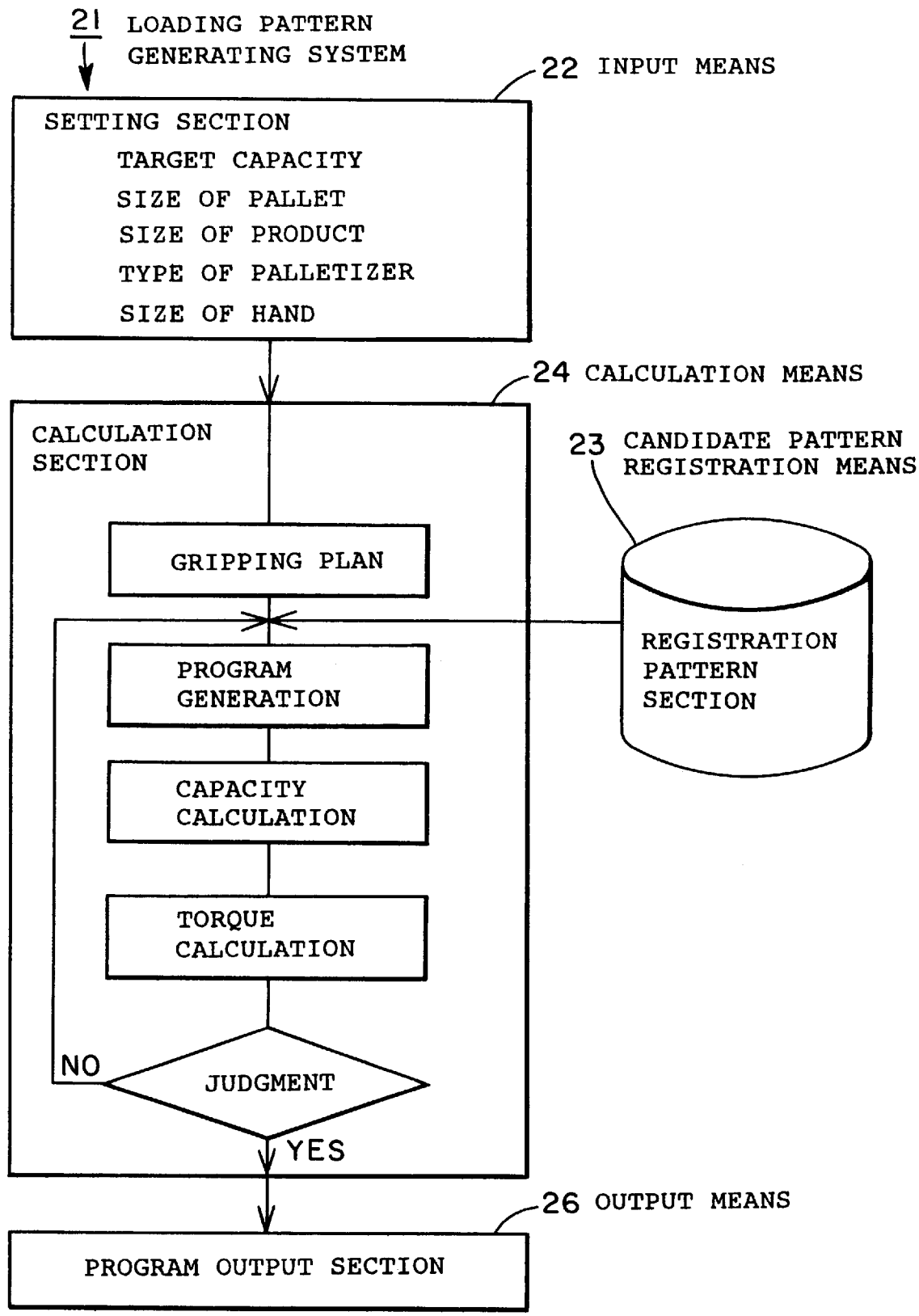
FIG. 1 is a structural diagram of a loading pattern generating system according to an embodiment of the present invention.

Referring now to FIG. 1, a loading pattern generating system 21 includes an setting section 22, a registration pattern section 23, a calculation section 24 and a program output section 26. These sections are preferably embodied in computer units such as, for example, a computer unit of the control panel for controlling the loading device, or a personal computer other than the computer unit of the control panel. Setting section 22 is a setting device, such as a keyboard, for inputting parameters of target capacity, sizes of pallet, hand and product, and type of palletizer. Registration pattern section 23 contains stored candidate patterns from which an optimum loading pattern is to be selected. Calculation section 24 performs the calculations, as will be explained. Program output section 26 provides the output, either to the operator or to machinery.

The setting section 22 is composed of the parts such as a keyboard or a mouse which can performs various input setting, reading and driving units such a magnetic disc, an optical disc, a memory in which input setting items are recorded, and the like. The loading pattern generating conditions are input to setting section 22. The loading pattern generating conditions include at least the target capacity of products 4 to load on a pallet 6 (for example, the number of products 4 to be loaded per hour), the size of a pallet 6, the size of products 4, the data relating to the palletizer 3 such as the type of a palletizer 3, the size of a product 4 which the hand 14 can grip, the layout of the position of the palletizer 3, the station 5, the pallet 6 or the like.

The registration pattern section 23 is composed of recording media by which reading-out at the calculation section 24 is possible. The recording media is preferably a type of memory (for example, a ROM or a RAM), other magnetic discs or optical discs. The registration pattern section 23 has stored therein a plurality of candidate patterns for loading products 4 on the pallet 6. In each of the candidate patterns, the number of products 4 to be gripped by the hand 14 of the loading device, the arrangement for each step and the number of the loading steps of the products 4 on the pallet 6, and the like, are included.

The calculation section 24 includes of a micro computer and the like. Calculation section 24 generates a loading pattern for controlling the loading device, according to a loading pattern generating program. The calculation section 24 has the functions of a gripping planning means, a program generating means, a capacity calculation means, a torque calculation means, and a judging means.

The generation of a loading pattern by the loading pattern generating program comprises: a step for planning the number of products 4 gripped in the opening and closing direction of the pair of plates 16 of the hand 14 and the number of rows of products 4 arranged in the width direction of the plates 16 (gripping planning means); a step for reading out one of the candidate patterns registered in the registration pattern section 23 to prepare a program of the loading pattern corresponding to the loading pattern generating conditions inputted at the setting section 22 (program preparing means); a step for performing capacity calculation to find the loading capacity of the prepared loading pattern (capacity calculation means); a step for performing torque calculation to find the torque necessary for turning R, vertical movement D, and back and forth movement O of the loading device in the prepared loading pattern (torque calculation means); and a step for judging whether a particular loading pattern one that fulfills the target capacity while remaining with the specified torque of the loading device (judging means).

If the loading pattern is judged to be such a pattern that satisfies both loading capacity and torque requirements, the loading pattern is outputted to the program output section 26. If the loading pattern does not fulfill the requirements of target capacity, or if the torque is outside the specified torque of the loading device, a next candidate among the candidate patterns is called out from the registration pattern section 23, and is judged by the similar steps. This process is repeated until, either the requirements are met, or the closest value to the requirements is found.

The program output section 26 is composed of a monitor for outputting the loading pattern calculated at the calculation section 24 such as a cathode-ray tube or a liquid crystal display, writing and driving units of a magnetic disc, an optical disc, a memory and the like by which recording of the program of the loading pattern is possible, an interface connected to the control panel controlling the loading device, and the like.

When the loading pattern generating system 21 is composed of a computer unit of the control panel of the palletizer 3, the program of the generated loading pattern is registered in the computer unit. When the loading pattern generating system 21 is composed of a computer unit such as a personal computer other than the control panel, the program of the generated loading pattern is moved to the control panel of the palletizer 3 using recording media such as a magnetic disc, an optical disc or a memory, or by on-line processing.

Furthermore, the loading pattern generating program is installed into the computer unit of the control panel of the palletizer 3, or the computer unit such as a personal computer other than the control panel or the like, through recording media such as a magnetic disc, a optical disc or a memory in which the loading pattern generating program is recorded.

Next, by referring to the explanatory drawings of the display screen in FIG. 4 to FIG. 6 and the flow charts in FIG. 7 to FIG. 11, the generation of a loading pattern by the calculation section 24 according to the loading pattern generating program, will be described. The display screen is a screen shown in a monitor of the program output section 26.

When the loading pattern generating program is started at the calculation section 24, the dialog box of 'size data input' shown in FIG. 4 is shown in the monitor. At the dialog box, the size of a product 4 as an object to be transported is inputted in the column of 'transported object size', and the size of a pallet 6 is inputted in the column of 'pallet size', and the data of the station 5, the type of the hand 14, the type of the pallet 6 and the like are inputted in the column of 'station'. The inputting is performed by a keyboard, menu selection, mouse of the setting section 22 or the like.

When 'setting' is clicked, the dialog box of 'automatic generation setting' shown in FIG. 5 is shown in the monitor. At the dialog box, the required data are inputted in each of the columns of 'automatic generation type', 'target capacity', 'minimum loading efficiency', and 'time setting'. The inputting is performed by the key board of the setting section 22 or the like.

Then, the type of automatic generation is selected among the next five types of automatic generation.

'Automatic generation of pattern is not performed' is a type where the function of automatic generation is not used, and the operator sets the loading pattern as before.

'Automatic generation by present hand and set value (approximate value)' is a type where the number of products gripped by the hand 14 is calculated from the target capacity, but the value cannot exceed the maximum number of products gripped by the hand 14 presently attached to the palletizer 3. The maximum number of products gripped by the present hand 14 is determined by the length of the hand 14 and the size of the products 4. As the loading pattern, the first loading pattern with a capacity exceeding the target capacity is automatically generated. If the target capacity is not exceeded, a loading pattern with the maximum capacity of the present hand 14, is calculated.

'Automatic generation by maximum number of products gripped by present hand' is a type where regardless of the target capacity, a loading pattern with the maximum capacity is automatically generated by the maximum number of products gripped by the present hand 14.

'Automatic generation by set value of target capacity (approximate value)' is a type where the number of gripped products is calculated from the target capacity, and a recommended hand is proposed, and the first loading pattern with a capacity exceeding the target capacity is automatically generated.

'Automatic generation by set value of target capacity (maximum value)' is a type where the number of gripped products is calculated from the target capacity, and a recommended hand is proposed, and a loading pattern with the maximum capacity exceeding the target capacity is automatically generated.

Into 'target value', the target value to load the products 4 per unit time is inputted.

Into 'minimum loading efficiency', the minimum value of the ratio of the area occupied by the products 4 to the area of pallet 6, is set by %.

Into 'time setting', the time from the emitting of an opening signal or a closing signal to the actual opening or closing of the pair of plates 16 of the hand 14, is inputted. Furthermore, the replacement time from the finish of loading of a pallet 6 to the finish of replacement of a next empty pallet 6 at the loading position 7 after the pallet 6 is carried out, is inputted.

Furthermore, in dialog boxes, not shown in FIG. 4 and FIG. 5, other loading pattern generating conditions such as the type of the palletizer 3, the layout relating to the position of the palletizer 3, the position of the station 5 and the position of the loading position 7, the loading type (whether the loading of the products 4 is the bar-like loading or the alternate loading), are inputted.

Furthermore, in the dialog box shown in FIG. 4, if the check box of 'automatic generation' is checked and 'loading type' is clicked, the automatic generation of a loading pattern is performed on the basis of the set loading pattern generating conditions.

Referring now to FIGS. 7–11, to start the automatic generation of a loading pattern, first, the setting of the initial values for automatic generation is performed (step 1). Here, the maximum number of steps capable of being loaded is calculated from the vertical (Z axis) working area of the palletizer 3, and the number of products capable of being loaded per step is calculated from the size of a product 4 and the size of a pallet 6, and the maximum effective number of products gripped by the hand 14 is calculated from the length in the longitudinal dimension of a pallet 6 and the length of a product 4 including the loading clearance, and the minimum number of products per step is calculated from the minimum loading efficiency.

Furthermore, at the step 2, the angle $\alpha$ (shown in FIG. 3) between the center of the product 4 on the station 5 and the center of the pallet 6 is calculated. Using this information, the maximum capacity when gripping one to four products is calculated according to the angle a and the type of the palletizer 3. The number of gripped products to start retrieving is calculated from the maximum effective number of gripped products and the maximum capacity and the target capacity.

Next, whether 'automatic generation type' is 'automatic generation by present hand and set value (approximate value)', is judged (step 3).

If the setting is 'automatic generation by present hand and set value (approximate value)', the maximum number of products gripped by the present hand is calculated from the length of the present hand 14 (step 4), and whether the maximum effective number of gripped products exceeds the maximum number of products gripped by the present hand, is judged (step 5). Only when the maximum effective number of gripped products exceeds the maximum number of products gripped by the present hand, the maximum effective number of gripped products is adjusted to a value equal to the value of the maximum number of products that can be gripped by the present hand (step 6).

Furthermore, whether the number of gripped products to start retrieving exceeds the maximum effective number of gripped products, is judged (step 7). If the number of gripped products to start retrieving exceeds the maximum effective number of gripped products, the number of gripped products to start retrieving is made equal to the value of the maximum effective number of gripped products (step 8). If the number of gripped products to start retrieving does not exceed the maximum effective number of gripped products, the number of gripped products to start retrieving is left at the value calculated at the step 2.

Accordingly, the number of gripped products to start retrieving by the hand 14 is calculated from the target capacity. But the number of gripped products to start retrieving is set so that the number of gripped products to start retrieving does not exceeds the maximum number of products gripped by the present hand and the maximum effective number of gripped products.

Next, whether 'automatic generation type' is 'automatic generation by maximum number of products gripped by present hand', is judged (step 9).

If the selection is 'automatic generation by maximum number of products gripped by present hand', the maximum number of products gripped by the present hand is calculated from the length of the present hand 14 (step 10), and whether the maximum effective number of gripped products exceeds the maximum number of products gripped by the present hand, is judged (step 11). If the maximum effective number of gripped products exceeds the maximum number of products capable of being gripped by the present hand, the maximum effective number of gripped products and the number of gripped products to start retrieving are set equal to the value of the maximum number of products gripped by the present hand (step 12). If the maximum effective number of gripped products does not exceed the maximum number of products gripped by the present hand, the number of gripped products to start retrieving is set to the value of the maximum effective number of gripped products (step 13).

Consequently, regardless of the target capacity, the maximum number of products gripped by the present hand 14 (or the maximum effective number of gripped products) is set as the number of gripped products to start retrieving.

Next, whether 'automatic generation type' is 'automatic generation by set value of target capacity (approximate value)' or 'automatic generation by set value of target capacity (maximum value)', is judged (step 14).

If the setting is 'automatic generation by set value of target capacity (approximate value)' or 'automatic generation by set value of target capacity (maximum value)', the recommended length of the hand is calculated by the number of gripped products to start retrieving (step 15).

After that, zero is set as the initial value of the final capacity to be calculated by the automatic generation (step 16).

Next, the first candidate pattern corresponding to the number of gripped products to start retrieving is selected and read out among a plurality of candidate patterns registered in the registration pattern section 23.

About the read-out candidate pattern, whether the candidate pattern has some problems such as a problem that the candidate pattern is not a pattern of the first level (step 17), a problem that the candidate pattern has an efficiency not more than the minimum loading efficiency (step 18), or a problem that the candidate pattern causes an error of collapse of goods or the like (step 19), is judged respectively.

In a case where the candidate pattern has no problem, a real loading pattern is developed so as to perform actual loading, from the data of the candidate pattern (step 20). Whether the real loading pattern is normally prepared, is confirmed (step 21).

In a case where the candidate pattern has a problem or where the real loading pattern is not normally prepared, the process advances to the step 50 and, if a next candidate pattern exists, the process returns to the step 17, and the next candidate pattern is similarly processed.

Next, if the real loading pattern is normally prepared, whether the type of loading is the alternate loading, is judged (step 22).

If the type of loading is the alternate loading, the real loading pattern for the first step is prepared (step 23). If the real loading pattern for the first step has no problem such as collapse of goods (step 24), the real loading pattern for the second step is prepared (step 25). If the real loading pattern for the second step has no problem such as collapse of goods (step 26), whether the longitudinal direction of the pallet 6 is different from the longitudinal direction of the real loading pattern, is judged (step 27). If the two directions agree, loading data are prepared, which include the loading order or data of the position, and which can be the base to prepare a program (step 28).

If the type of loading is not the alternate loading, the real loading pattern for the first step is prepared (step 29). If the real loading pattern for the first step has no problem such as collapse of goods (step 30), whether the longitudinal direction of the pallet 6 is different from the longitudinal direction of the real loading pattern, is judged (step 31). If the two directions agree, loading data are prepared, which include data such as data of the loading order or data of the position, and which can be the base to prepare a program (step 32).

If there is a problem such as collapse of goods, or if the longitudinal direction of the pallet 6 is different from the longitudinal direction of the real loading pattern, the process advances to the step 49, and whether the processes from the head end to the end of the real loading pattern are performed, is confirmed.

Next, a program of the loading pattern is prepared according to the prepared loading data (step 33). About the program, whether it is normally prepared, is confirmed (step 34). When there is a failure in the preparation of the program, the process advances to the step 49, and whether the processes from the head end to the end of the real loading pattern are performed, is confirmed.

When the program is normally prepared, the program is developed in the check area (step 35), and whether there is any error out of the working area, is confirmed (step 36).

If there is an error out of the working area, whether it is out of the working area in the vertical (Z axis) direction of the palletizer 3, is judged (step 37). If the error is an error out of the working area in the vertical (Z axis) direction of the palletizer 3, the final capacity is set to zero (reset or clear) (step 38), and the process advances to the step 54. If the error is a different error, the process advances to the step 49, and whether the processes from the head end to the end of the real loading pattern are performed, is confirmed.

If there is no error out of the working area, considering the opening and closing time of the hand 14 and the replacing time of the pallet 6, the capacity is calculated (step 39).

Next, whether 'automatic generation type' is 'automatic generation by present hand and set value (approximate value)' or 'automatic generation by set value of target capacity (approximate value)', is judged (step 40).

If the type is 'automatic generation by present hand and set value (approximate value)' or 'automatic generation by set value of target capacity (approximate value)', first, whether the calculated capacity is at least the target capacity, is confirmed (step 41).

If the calculated capacity does not equal or exceed target capacity, whether the calculated capacity is larger than the final capacity, is confirmed (step 42). If the calculated capacity is larger than the final capacity, the process for the renewal of the final capacity is started, and the torque calculation is performed (step 43). If the calculated torque is within the specified torque (step 44), the final capacity is renewed to be the calculated capacity (step 45). If the calculated torque is out of the specified torque, the process advances to the step 49, and whether the processes from the head end to the end of the real loading pattern are performed, is confirmed. If the calculated capacity is smaller than the final capacity, the process advances to the step 49, to confirm whether the processes from the head end to the end of the real loading pattern are performed. The final capacity indicates the last calculated capacity stored at the step 45 the final capacity is compared with the capacity calculated this time. The one of them nearer to the target capacity is stored at the step 45.

If the calculated capacity is not less than the target capacity, whether the final capacity is not less than the target capacity, is confirmed (step 46). If the final capacity is smaller than the target capacity, the process advances to the step 43, and the process for the renewal of the final capacity is started. If the final capacity is not less than the target capacity, whether the calculated capacity is larger than the final capacity, is confirmed (step 47). If the calculated capacity is larger than the final capacity, the process advances to the step 43, and the process for the renewal of the final capacity is started. If it is smaller, the process advances to the step 49, and whether the processes from the head end to the end of the real loading pattern are performed, is confirmed.

Furthermore, if 'automatic generation type' is not 'automatic generation by present hand and set value (approximate value)' or 'automatic generation by set value of target capacity (approximate value)', that is, if it is 'automatic generation by maximum number of products gripped by present hand' or 'automatic generation by set value of target capacity (maximum value)', whether the calculated capacity is larger than the final capacity, is confirmed (step 48). If the calculated capacity is larger than the final capacity, the process advances to the step 43, and the process for the renewal of the final capacity is started. If the calculated capacity is smaller than the final capacity, the process advances to the step 49, and whether the processes from the head end to the end of the real loading pattern are performed, is confirmed.

Then, whether the processes from the head end to the end of the real loading pattern are performed, is confirmed (step 49). In a case where the processes to the end is not yet performed, the process returns to the step 22, and the processing is continued.

In a case where the processes from the head end to the end of the real loading pattern are performed, whether the processes from the head end to the end of the candidate pattern are performed, is confirmed (step 50). If there is a next candidate pattern, the process returns to the step 17, and the candidate pattern is similarly processed. Thus, if there are a plurality of candidate patterns, they are similarly processed in order.

Next, when all candidate patterns are processed, whether the number of gripped products to start retrieving is less than the maximum effective number of gripped products and the target capacity exceeds the final capacity, is judged (step 51).

If the number of gripped products to start retrieving is less than the maximum effective number of gripped products, or if the final capacity does not reach the target capacity, whether the number of gripped products to start retrieving is not more than four, is judged (step 52). If the number is not more than four, one is added to the number of gripped products to start retrieving (step 53), and the process returns to the step 14, and such a candidate pattern that the final capacity reaches the target capacity is retrieved, and the pattern is similarly processed.

Furthermore, in a case where the number of gripped products to start retrieving is more than the maximum effective number of gripped products and the final capacity exceeds the target capacity, since the final capacity is not zero (step 54), the process advances to the next step 55.

In a case other than the case where the number of gripped products to start retrieving is more than the maximum effective number of gripped products and the final capacity exceeds the target capacity, since the final capacity is zero, whether the reason why the final capacity is zero, is a reason of being out of the working area in the vertical (Z axis) direction of the palletizer 3, is judged (step 56). If the reason is a reason of being out of the working area in the vertical (Z axis) direction of the palletizer 3, the error message of 'all patterns are out of reach area' is shown on the monitor (step 57). If the reason is another reason, the error message of 'there is no pattern with efficiency exceeding minimum loading efficiency' is shown on the monitor (step 58).

At the step 55, a real loading pattern with the maximum capacity among the calculated ones is employed in the case of the maximum value, and a real loading pattern with a capacity which is not less than the target capacity and is nearest to the target capacity, is employed in the case of the approximate value. By the employed real loading pattern, loading data are prepared, and from the loading data, a program of the loading pattern is prepared, and the prepared program is developed in the check area. Furthermore, by the prepared program, considering the opening and closing time of the hand 14 and the replacing time of the pallet 6, the capacity is calculated. Furthermore, the maximum number of plural gripped products in the prepared program is calculated, and by the maximum number of plural gripped products, a recommended length of a hand is calculated. Torque calculation of each of the torques of turning R, vertical movement D, and back and forth movement O of the palletizer 3 in a pattern with the highest capacity, is performed.

Finally, the prepared program is developed to the display area. The display screen of the monitor on which the prepared program is developed to the display area, is shown in FIG. 6. In the column of 'loading pattern', the arrangement of the products 4 on the pallet 6 is shown for every step (lateral or three-dimensional display can also be shown, if selected), and in the column of 'maximum capacity calculated result', the planned capacity, the recommended length of a hand, and each of the torques of turning R, vertical movement D, and back and forth movement O, are shown.

As mentioned above, in response only to inputting of the loading pattern generating conditions, a loading pattern is prepared on the basis of the loading pattern generating conditions and the candidate patterns. A capacity calculation to find the loading capacity of the loading pattern is performed, and such a loading pattern that the loading capacity fulfills the target capacity is calculated. Accordingly, a loading pattern which is not affected by the experience of the operator and by which deficiency of loading capacity is not caused when products are actually loaded by the palletizer 3, can automatically be generated.

Furthermore, torque calculation to find the torque necessary for the palletizer 3 in the prepared loading pattern, is performed, and a loading pattern is calculated in which the torque remains within the specified torque of the palletizer 3 and in which the loading capacity fulfills the target capacity. Consequently, a loading pattern by which excessive torque of the palletizer 3 or deficiency of loading capacity is not caused when products are actually loaded by the palletizer 3, can automatically be generated.

In a case where the loading pattern generating system 21 is composed of a computer unit of the control panel of the palletizer 3, the program of the generated loading pattern can be registered in the computer unit.

In a case where the loading pattern generating system 21 is composed of a computer unit such as a personal computer other than the control panel, the program of the generated loading pattern is recorded on recording media such as a magnetic disc, a optical disc, or a memory and is moved to the control panel of the palletizer 3, or the program of the generated loading pattern is moved to the control panel of the palletizer 3 by on-line processing, and it is registered.

Furthermore, into the computer unit of the control panel of the palletizer 3, or the computer unit such as a personal computer other than the control panel, and the like, the loading pattern generating program can be installed, through the recording media such as a magnetic disc, a optical disc or a memory, in which the loading pattern generating program is recorded.

According to the loading pattern generating system in response only to the inputting of loading pattern generating conditions, a loading pattern is prepared on the basis of the loading pattern generating conditions and the candidate patterns, and capacity calculation is performed to find the loading capacity of the loading pattern. The resulting loading pattern is one in which the loading capacity fulfills the target capacity. Consequently, a loading pattern which is not affected by the experience of the operator and by which deficiency of loading capacity is not caused when the products are actually loaded by a loading device, can automatically be generated.

According to the loading pattern generating system, in addition to the effect of the loading pattern generating system, a torque calculation is performed to find the torque necessary for the loading device in the prepared loading pattern. The selected loading pattern is one in which the torque is within the specified torque of the loading device and the loading capacity fulfills the target capacity. Consequently, a loading pattern by which torque over of the loading device or deficiency of loading capacity is not caused when the products are actually loaded by the loading device, can automatically be generated.

According to the loading device of the present invention, deficiency of loading capacity or torque over of the loading machine is not caused when loading products, since the products are loaded on the pallet by the loading machine on the basis of the loading pattern calculated by the loading pattern generating system.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A loading pattern generating system comprising:

input means for inputting loading pattern generating conditions;

said loading pattern generating conditions including at least size of a pallet, a size of a product to be loaded on said pallet, data relating to a loading device for loading products on said pallet, and a target capacity to load products on said pallet;

a candidate pattern registration means in which a plurality of candidate patterns to load products on said pallet are registered;

calculation means for preparing a loading pattern for controlling a loading device corresponding to said loading pattern generating conditions inputted by said input means, on the basis of said candidate patterns registered in said candidate pattern registration means, and which performs capacity calculation to find loading capacity of said loading pattern, and which finds such a loading pattern that said loading capacity fulfills said target capacity; and output means for outputting said loading pattern calculated by said calculation means.

2. A loading pattern generating system according to claim 1, wherein said calculation means performs torque calculation to find a torque necessary for said loading device in said prepared loading pattern, and finds such a loading pattern that said torque is within a specified torque of said loading device and said loading capacity fulfills said target capacity.

3. A loading device comprising:

input means for inputting loading pattern generating conditions;

said loading pattern generating conditions including at least size of a pallet, a size of a product to be loaded on said pallet, data relating to a loading device for loading products on said pallet, and a target capacity to load products on a pallet;

a candidate pattern registration means in which a plurality of candidate patterns to load products on said pallet are registered;

calculation means for preparing a loading pattern for controlling said loading device corresponding to said loading pattern generating conditions inputted by said input means, on the basis of said candidate patterns registered in said candidate pattern registration means, and which performs capacity calculation to find loading capacity of said loading pattern, and which finds such a loading pattern that said loading capacity fulfills said target capacity;

output means for outputting said loading pattern calculated by said calculation means; and a loading machine for loading products on a pallet on the basis of said loading pattern.

4. A loading device comprising:

input means for inputting loading pattern generating conditions;

said loading pattern generating conditions including at least size of a pallet, a size of a product to be loaded on said pallet, data relating to a loading device for loading products on said pallet, and a target capacity to load products on said pallet;

a candidate pattern registration means in which a plurality of candidate patterns to load products on said pallet are registered;

calculation means for preparing a loading pattern for controlling said loading device corresponding to said loading pattern generating conditions inputted by said input means, on the basis of said candidate patterns registered in said candidate pattern registration means, and which performs capacity calculation to find loading capacity of said loading pattern, and which finds such a loading pattern that said loading capacity fulfills said target capacity;

said calculation means including means for performing a torque calculation to find a torque necessary for said loading device in said prepared loading pattern, and finds such a loading pattern that said torque is within a specified torque of said loading device and said loading capacity fulfills said target capacity;

output means for outputting said loading pattern calculated by said calculation means; and a loading machine for loading products on a pallet on the basis of said output loading pattern.

5. A loading pattern generating system, said system being of a type using a controllable hand for loading a plurality of a product onto a pallet, comprising:

a candidate pattern registration means;

said candidate pattern registration means including a plurality of candidate patterns for loading said product onto said pallet;

input means for inputting setting which include at least some of a target capacity, a pallet size, a product size, a type of palletizer and a size of a said hand;

means for comparing a result of ones of said plurality of candidate patterns to find a one of said candidate patterns that satisfies said settings;

means for calculating whether a torque imposed on said palletizer by a candidate pattern exceeds a maximum permitted torque;

means for outputting a candidate pattern which satisfies both said settings and which does not exceed said maximum permitted torque; and when the conditions in the preceding clause are not satisfied, said means for comparing proceeds to a next candidate pattern to repeat the comparison and calculation.

6. A system according to claim 5, further comprising:

means for calculating a loading capacity of a candidate pattern;

said means for outputting further includes means for outputting said candidate pattern having a loading capacity at least equal to said target loading capacity; and when any one of the conditions in the preceding clause, and in the final clause of claim 5 is not satisfied, said means for comparing proceeds to the next candidate pattern to repeat the comparison and calculation.

* * * * *